(12) United States Patent
Faaborg et al.

(10) Patent No.: US 9,575,720 B2
(45) Date of Patent: Feb. 21, 2017

(54) VISUAL CONFIRMATION FOR A RECOGNIZED VOICE-INITIATED ACTION

(71) Applicant: Google Inc., Mountain View, CA (US)

(72) Inventors: Alexander Faaborg, Mountain View, CA (US); Peter Ng, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/109,660

(22) Filed: Dec. 17, 2013

(65) Prior Publication Data

US 2015/0040012 A1 Feb. 5, 2015

Related U.S. Application Data

(60) Provisional application No. 61/860,679, filed on Jul. 31, 2013.

(51) Int. Cl.
*G06F 3/16* (2006.01)
*G10L 15/22* (2006.01)

(52) U.S. Cl.
CPC ............... *G06F 3/167* (2013.01); *G10L 15/22* (2013.01); *G10L 2015/223* (2013.01); *G10L 2015/228* (2013.01)

(58) Field of Classification Search
CPC ........ G10L 15/22; G10L 15/265; G10L 15/26; G06F 3/167; G06F 3/16; G06F 3/0482
USPC .... 715/728, 716; 704/275, E15.04, E15.001, 704/270
See application file for complete search history.

(56) References Cited

U.S. PATENT DOCUMENTS

| | | | |
|---|---|---|---|
| 5,864,815 A | 1/1999 | Rozak et al. | |
| 6,233,560 B1 | 5/2001 | Tannenbaum | |
| 7,966,188 B2 | 6/2011 | Ativanichayaphong et al. | |
| 8,275,617 B1 | 9/2012 | Morgan et al. | |
| 2005/0165609 A1* | 7/2005 | Zuberec et al. | 704/270 |

(Continued)

FOREIGN PATENT DOCUMENTS

WO 2010141802 A1 12/2010

OTHER PUBLICATIONS

"Voice commands for Windows Phone 8", Microsoft 2013 [online]. Feb. 1, 2013. Retrieved from the Internet: <http://msdn.microsoft.com/en-us/library/windowsphone/develop/jj206959(v=vs. 105). aspx> 10 pgs.

(Continued)

*Primary Examiner* — Amy Ng
*Assistant Examiner* — Sang H Kim
(74) *Attorney, Agent, or Firm* — Shumaker & Sieffert, P.A.

(57) ABSTRACT

Techniques described herein provide a computing device configured to provide an indication that the computing device has recognized a voice-initiated action. In one example, a method is provided for outputting, by a computing device and for display, a speech recognition graphical user interface (GUI) having at least one element in a first visual format. The method further includes receiving, by the computing device, audio data and determining, by the computing device, a voice-initiated action based on the audio data. The method also includes outputting, while receiving additional audio data and prior to executing a voice-initiated action based on the audio data, and for display, an updated speech recognition GUI in which the at least one element is displayed in a second visual format, different from the first (Continued)

visual format, to indicate that the voice-initiated action has been identified.

20 Claims, 8 Drawing Sheets

(56) References Cited

U.S. PATENT DOCUMENTS

| | | | |
|---|---|---|---|
| 2007/0033054 A1* | 2/2007 | Snitkovskiy et al. | 704/275 |
| 2007/0061148 A1* | 3/2007 | Cross, Jr. | G10L 15/22 |
| | | | 704/275 |
| 2007/0088557 A1 | 4/2007 | Andrew | |
| 2008/0215240 A1* | 9/2008 | Howard et al. | 701/213 |
| 2010/0257554 A1 | 10/2010 | Friedlander et al. | |
| 2010/0312547 A1* | 12/2010 | Van Os | G06F 3/167 |
| | | | 704/9 |
| 2011/0013756 A1 | 1/2011 | Davies et al. | |
| 2011/0301955 A1 | 12/2011 | Byrne et al. | |
| 2012/0110456 A1* | 5/2012 | Larco et al. | 715/728 |
| 2012/0253822 A1* | 10/2012 | Schalk | 704/270.1 |
| 2012/0253824 A1 | 10/2012 | Alcantara Talavera | |
| 2013/0018656 A1* | 1/2013 | White et al. | 704/235 |
| 2013/0080178 A1* | 3/2013 | Kang | G06F 3/167 |
| | | | 704/275 |
| 2013/0110508 A1 | 5/2013 | Bak et al. | |
| 2013/0211836 A1* | 8/2013 | Jordan et al. | 704/246 |
| 2013/0219277 A1* | 8/2013 | Wang et al. | 715/728 |
| 2013/0253937 A1 | 9/2013 | Cho et al. | |
| 2014/0207452 A1* | 7/2014 | Klein | G06F 3/0304 |
| | | | 704/235 |
| 2014/0222436 A1* | 8/2014 | Binder | G06F 3/167 |
| | | | 704/275 |
| 2014/0278443 A1* | 9/2014 | Gunn | G06F 3/0488 |
| | | | 704/275 |
| 2015/0040012 A1 | 2/2015 | Faaborg et al. | |

OTHER PUBLICATIONS

International Search Report and Written Opinion of International Application No. PCT/US2014/043236, mailed Sep. 25, 2014 9 pp.
International Preliminary Report on Patentability from International Application No. PCT/US2014/0432636, mailed Feb. 11, 2016, 7 pp.
Patent Examination Report No. 1 from counterpart Australian Application No. 2014296734, issued Sep. 1, 2016 7 pgs.
Response to Patent Examination Report No. 1 from counterpart Australian Application No. 2014296734, filed Oct. 21, 2016 15 pgs.
Notice of Acceptance from counterpart Australian Application No. 2014296734, issued Nov. 18, 2016 7 pgs.

* cited by examiner

VISUAL CONFIRMATION FOR A RECOGNIZED VOICE-INITIATED ACTION

This application claims the benefit of U.S. Provisional Application No. 61/860,679, filed Jul. 31, 2013, the entire content of which is incorporated by reference herein.

BACKGROUND

Some computing devices (e.g., mobile phones, tablet computers, personal digital assistants, etc.) may be voice-activated. Voice-activated computing devices can be controlled by means of audio data, such as a human voice. Such computing devices provide functionality to detect speech, determine an action indicated by the detected speech, and execute the indicated the action. For example, a computing device may receive audio input corresponding to a voice command, such as "search," "navigate," "play," "pause," "call," or the like. In such instances, the computing device may analyze the audio input using speech-recognition techniques to determine a command and then execute an action associated with the command (e.g., provide a search option, execute a map application, begin playing a media file, stop playing a media file, place a phone call, etc.). In this way, a voice-activated computing device may provide users with the ability to operate some features of the computing device without use of the user's hands.

SUMMARY

In one example, the disclosure is directed to a method for outputting, by a computing device and for display, a speech recognition graphical user interface (GUI) having at least one element in a first visual format. The method further includes receiving, by the computing device, audio data. The method also includes determining, by the computing device, a voice-initiated action based on the audio data. The method further includes outputting, while receiving additional audio data and prior to executing a voice-initiated action based on the audio data, and for display, an updated speech recognition GUI in which the at least one element is displayed in a second visual format, different from the first visual format, to indicate that the voice-initiated action has been identified.

In another example, the disclosure is directed to a computing device, comprising a display device and one or more processors. The one or more processors are operable to output, for display at the display device, a speech recognition graphical user interface (GUI) having at least one element in a first visual format. The one or more processors are operable to receive audio data and determine a voice-initiated action based on the audio data. The one or more processors are further configured to output, while receiving additional audio data and prior to executing a voice-initiated action based on the audio data, and for display, an updated speech recognition GUI in which the at least one element is displayed in a second visual format, different from the first visual format, to indicate that the voice-initiated action has been identified.

In another example, the disclosure is directed to a computer-readable storage medium encoded with instructions that, when executed by one or more processors of a computing device, cause the one or more processors to output, for display, a speech recognition graphical user interface (GUI) having at least one element in a first visual format. The instructions further cause the one or more processors to receive audio data and determine a voice-initiated action based on the audio data. The instructions further cause the one or more processors to output, while receiving additional audio data and prior to executing a voice-initiated action based on the audio data, and for display, an updated speech recognition GUI in which the at least one element is displayed in a second visual format, different from the first visual format, to indicate that the voice-initiated action has been identified.

The details of one or more examples are set forth in the accompanying drawings and the description below. Other features, objects, and advantages of the disclosure will be apparent from the description and drawings, and from the claims.

DETAILED DESCRIPTION

In general, this disclosure is directed to techniques by which a computing device may provide visual confirmation of a voice-initiated action determined based on received audio data. For example, in some implementations, the computing device can receive audio data from an audio input device (e.g., a microphone), transcribe the audio data (e.g., speech), determine if the audio data includes an indication of a voice-initiated action and, if so, provide visual confirmation of the indicated action. By outputting the visual confirmation of the voice-initiated action, the computing device may thus enable the user to more easily and quickly determine whether the computing device has correctly identified and is going to execute the voice-initiated action.

In some implementations, the computing device may provide visual confirmation of the recognized voice-initiated action by altering a visual format of an element corresponding to the voice-initiated action. For example, the computing device may output, in a first visual format, an element.

Responsive to determining that at least one word of one or more words of a transcription of received audio data corresponds to a particular voice-initiated action, the computing device may update the visual format of the element to a second visual format different than the first visual format. Thus, the observable difference between these visual formats may provide a mechanism by which a user may visually confirm that the voice-initiated action has been recognized by the computing device and that the computing device will execute the voice-initiated action. The element may be, for example, one or more graphical icons, images, words of text (based on, e.g., a transcription of the received audio data), or any combination thereof. In some examples, the element is an interactive user interface element. Thus, a computing device configured according to techniques described herein may change the visual appearance of an outputted element to indicate that the computing device has recognized a voice-initiated action associated with audio data received by the computing device.

Figure 1:
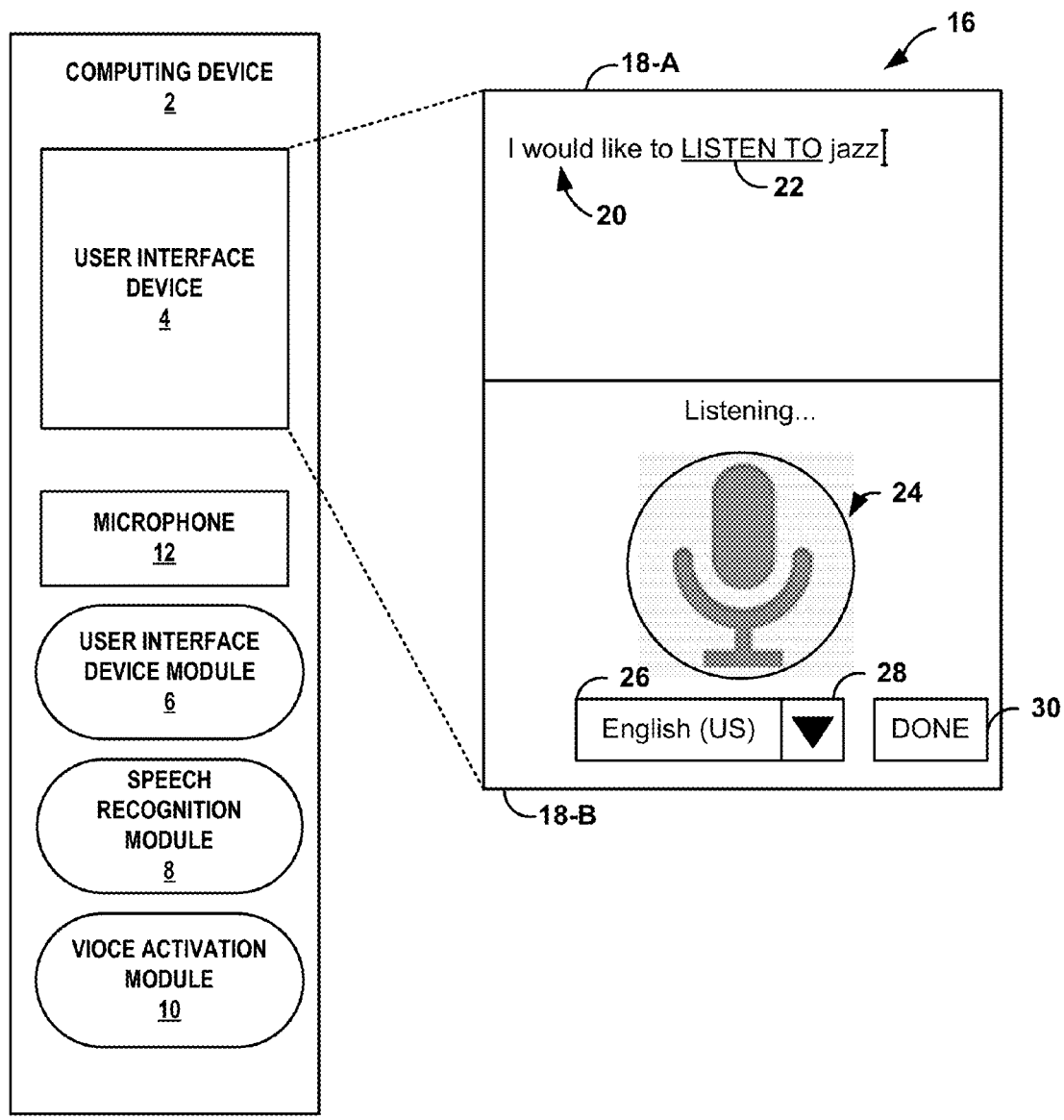
FIG. 1 is a conceptual diagram illustrating an example computing device that is configured to provide a graphical user interface that provides visual indication of a recognized voice-initiated action, in accordance with one or more aspects of the present disclosure.

FIG. 1 is a conceptual diagram illustrating an example computing device 2 that is configured to provide a graphical user interface 16 that provides visual indication of a recognized voice-initiated action, in accordance with one or more aspects of the present disclosure. Computing device 2 may be a mobile device or a stationary device. For example, in the example of FIG. 1, computing device 2 is illustrated as a mobile phone, such as a smartphone. However, in other examples, computing device 2 may be a desktop computer, a mainframe computer, tablet computer, a personal digital assistant (PDA), a laptop computer, a portable gaming device, a portable media player, a Global Positioning System (GPS) device, an e-book reader, eye glasses, a watch, television platform, an automobile navigation system, a wearable computing platform, or another type of computing device.

As shown in FIG. 1, computing device 2 includes a user interface device (UID) 4. UID 4 of computing device 2 may function as an input device and as an output device for computing device 2. UID 4 may be implemented using various technologies. For instance, UID 4 may function as an input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 4 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to the user of computing device 2.

UID 4 of computing device 2 may include a presence-sensitive display that may receive tactile input from a user of computing device 2. UID 4 may receive indications of the tactile input by detecting one or more gestures from a user of computing device 2 (e.g., the user touching or pointing to one or more locations of UID 4 with a finger or a stylus pen). UID 4 may present output to a user, for instance at a presence-sensitive display. UID 4 may present the output as a graphical user interface (e.g., user interface 16) which may be associated with functionality provided by computing device 2. For example, UID 4 may present various user interfaces of applications executing at or accessible by computing device 2 (e.g., an electronic message application, a navigation application, an Internet browser application, a media player application, etc.). A user may interact with a respective user interface of an application to cause computing device 2 to perform operations relating to a function.

The example of computing device 2 shown in FIG. 1 also includes a microphone 12. Microphone 12 may be one of one or more input devices of computing device 2. Microphone 12 is a device for receiving auditory input, such as audio data. Microphone 12 may receive audio data that includes speech from a user. Microphone 12 detects audio and provides related audio data to other components of computing device 2 for processing. Computing device 2 may include other input devices in addition to microphone 12.

For example, a portion of transcribed text that corresponds to the voice command (e.g., a "voice-initiated action") is altered such that the visual appearance of the portion of the transcribed text that corresponds to the voice command is different from the visual appearance of transcribed text that does not correspond to the voice command. For example, computing device 2 receives audio data at microphone 12. Speech recognition module 8 may transcribe speech included in the audio data, which may be in real-time or nearly in real-time with the received audio data. Computing device 2 outputs, for display, non-command text 20 corresponding to the transcribed speech. Responsive to determining that a portion of the transcribed speech corresponds to a command, computing device 2 may provide at least one indication that the portion of speech is recognized as a voice command. In some examples, computing device 2 may perform the action identified in the voice-initiated action. As used herein, "voice command" may also be referred to as a "voice-initiated action."

To indicate that computing device 2 identified a voice-initiated action within the audio data, computing device 2 may alter a visual format of a portion of the transcribed text that corresponds to the voice command (e.g., command text 22). In some examples, computing device 2 may alter the visual appearance of the portion of the transcribed text that corresponds to the voice command such that the visual appearance is different from the visual appearance of transcribed text that does not correspond to the voice command. For simplicity, any text associated with or identified as a voice-initiated action is referred to herein as "command text." Likewise, any text not associated with or identified as a voice-initiated action is referred to herein as "non-command text."

The font, color, size, or other visual characteristic of the text associated with the voice-initiated action (e.g., command text 22) may differ from text associated with non-command speech (e.g., non-command text 20). In another example, command text 22 may be highlighted in some manner while non-command text 20 is not highlighted. UI device 4 may alter any other characteristic of the visual format of the text such that the transcribed command text 22 is visually different than transcribed non-command text 20. In other examples, computing device 2 can use any combination of changes or alterations to the visual appearance of command text 22 described herein to visually differentiate command text 22 from non-command text 20.

In another example, computing device 2 may output, for display, a graphical element instead of, or in addition to, the transcribed text, such as icon 24 or other image. As used herein, the term "graphical element" refers to any visual element displayed within a graphical user interface and may also be referred to as a "user interface element." The graphical element can be an icon that indicates an action computing device 2 is currently performing or may perform.

In this example, when computing device 2 identifies a voice-initiated action, a user interface ("UI") device module 6 causes graphical element 24 to change from a first visual format to a second visual format indicating that computing device 2 has recognized and identified a voice-initiated action. The image of graphical element 24 in the second visual format may correspond to the voice-initiated action. For example, UI device 4 may display graphical element 24 in a first visual format while computing device 2 is receiving audio data. The first visual format may be, for example, icon 24 having the image of a microphone. Responsive to determining that the audio data contains a voice-initiated action requesting directions to a particular address, for example, computing device 2 causes icon 24 to change from the first visual format (e.g., an image of a microphone), to a second visual format (e.g., an image of a compass arrow).

In some examples, responsive to identifying a voice-initiated action, computing device 2 output a new graphical element corresponding to the voice-initiated action. For instance, rather than automatically taking the action associated with the voice-initiated action, the techniques described herein may enable computing device 2 to first provide an indication of the voice-initiated action. In certain examples, according to various techniques of this disclosure, computing device 2 may be configured to update graphical user interface 16 such that an element is presented in a different visual format based on audio data that includes an identified indication of a voice-initiated action.

In addition to UI device module 6, computing device 2 may also include speech recognition module 8 and voice activation module 10. Modules 6, 8, and 10 may perform operations described using software, hardware, firmware, or a mixture of hardware, software, and firmware residing in and executing on computing device 2. Computing device 2 may execute modules 6, 8, and 10 with multiple processors. Computing device 2 may execute modules 6, 8, and 10 as a virtual machine executing on underlying hardware. Modules 6, 8, and 10 may execute as one or more services of an operating system, a computing platform. Modules 6, 8, and 10 may execute as one or more remote computing services, such as one or more services provided by a cloud and/or cluster based computing system. Modules 6, 8, and 10 may execute as one or more executable programs at an application layer of a computing platform.

Speech recognition module 8 of computing device 2 may receive, from microphone 12, for example, one or more indications of audio data. Using speech recognition techniques, speech recognition module 8 may analyze and transcribe speech included in the audio data. Speech recognition module 8 may provide the transcribed speech to UI device module 6. UI device module 6 may instruct UID 4 to output, for display, text related to the transcribed speech, such as non-command text 20 of GUI 16.

Voice activation module 10 of computing device 2 may receive, from speech recognition module 8, for example, textual characters of transcribed speech from audio data detected at microphone 12. Voice activation module 10 may analyze the transcribed text to determine if it includes a keyword or phrase that activates a voice-initiated action. Once voice activation module 10 identifies a word or phrase that corresponds to a voice-initiated action, voice activation module 10 causes UID 4 to display, within user interface 16, a graphical element in a second, different visual format to indicate that a voice-initiated action has been successfully recognized. For example, when voice activation module 10 determines a word in the transcribed text corresponds to a voice-initiated action, UID 4 changes an output of the word from a first visual format (which may have been the same visual format as that of the rest of the transcribed non-command text 20) into a second, different visual format. For example, the visual characteristics of keywords or phrases that correspond to the voice-initiated action are stylized differently from other words that do not correspond to the voice-initiated action to indicate computing device 2 recognizes the voice-initiated action. In another example, when voice activation module 10 identifies a voice-initiated action, an icon or other image included in GUI 16 morphs from one visual format to another visual format.

UI device module 6 may cause UID 4 to present user interface 16. User interface 16 includes graphical indications (e.g., elements) displayed at various locations of UID 4. FIG. 1 illustrates icon 24 as one example graphical indication within user interface 16. FIG. 1 also illustrates graphical elements 26, 28, and 30 as examples of graphical indications within user interface 16 for selecting options or performing additional functions related to an application executing at computing device 2. UI module 6 may receive, as an input from voice activation module 10, information identifying a graphical element being displayed in a first visual format at user interface 16 as corresponding to or associated with a voice-initiated action. UI module 6 may update user interface 16 to change a graphical element from a first visual format to a second visual format in response to computing device 2 identifying the graphical element as associated with a voice-initiated action.

UI device module 6 may act as an intermediary between various components of computing device 2 to make determinations based on input detected by UID 4 and to generate output presented by UID 4. For instance, UI module 6 receives, as input from speech recognition module 8, the transcribed textual characters of the audio data. UI module 6 causes UID 4 to display the transcribed textual characters in a first visual format at user interface 16. UI module 6 receives information identifying at least a portion of the textual characters as corresponding to command text from voice activation module 10. Based on the identifying information, UI module 6 displays the text associated with the voice command, or another graphical element, in a second, different visual format than the first visual format the command text or graphical element was initially displayed in.

For example, UI module 6 receives, as an input from voice activation module 10, information identifying a portion of the transcribed textual characters as corresponding to a voice-initiated action. Responsive to voice activation module 10 determining that the portion of the transcribed text corresponds to a voice-initiated action, UI module 6 changes the visual format of a portion of the transcribed textual characters. That is, UI module 6 updates user interface 16 to change a graphical element from a first visual format to a second visual format responsive to identifying the graphical element as associated with a voice-initiated action. UI module 6 may cause UID 4 to present the updated user interface 16. For example, GUI 16 includes text related to the voice command, command text 22 (i.e., "listen to"). Responsive to voice activation module 10 determining that "listen to" corresponded to a command, UI device 4 updates GUI 16 to display command text 22 in a second format different from the format of the rest of non-command text 20.

In the example of FIG. 1, user interface 16 is bifurcated into two regions: an edit region 18-A and an action region 18-B. Edit region 18-A and action region 18-B may include graphical elements such as transcribed text, images, objects, hyperlinks, characters of text, menus, fields, virtual buttons, virtual keys, etc. As used herein, any of the graphical elements listed above may be user interface elements. FIG. 1 shows just one example layout for user interface 16. Other examples where user interface 16 differs in one or more of layout, number of regions, appearance, format, version, color scheme, or other visual characteristic are possible.

Edit region 18-A may be an area of the UI device 4 configured to receive input or to output information. For example, computing device 2 may receive voice input that speech recognition module 8 identifies as speech, and edit region 18-A outputs information related to the voice input. For example, as shown in FIG. 1, user interface 16 displays non-command text 20 in edit region 18-A. In other examples, edit region 18-A may update the information displayed based on touch-based or gesture-based input.

Action region 18-B may be an area of the UI device 4 configured to accept input from a user or to provide an indication of an action that computing device 2 has taken in the past, is currently taking, or will be taking. In some examples, action region 18-B includes a graphical keyboard that includes graphical elements displayed as keys. In some examples, action region 18-B would not include a graphical keyboard while computing device 2 is in a speech recognition mode.

In the example of FIG. 1, computing device 2 outputs, for display, user interface 16, which includes at least one graphical element that may be displayed in a visual format that indicates that computing device 2 has identified a voice-initiated action. For example, UI device module 6 may generate user interface 16 and include graphical elements 22 and 24 in user interface 16. UI device module 6 may send information to UID 4 that includes instructions for displaying user interface 16 at a presence-sensitive display 5 of UID 4. UID 4 may receive the information and cause the presence-sensitive display 5 of UID 4 to present user interface 16 including a graphical element that may change visual format to provide an indication that a voice-initiated action has been identified.

User interface 16 includes one or more graphical elements displayed at various locations of UID 4. As shown in the example of FIG. 1, a number of graphical elements are displayed in edit region 18-A and action region 18-B. In this example, computing device 2 is in a speech recognition mode, meaning microphone 12 is turned on to receive audio input and speech recognition module 8 is activated. Voice activation module 10 may also be active in speech recognition mode in order to detect voice-initiated actions. When computing device 2 is not in the speech-recognition mode, speech recognition module 8 and voice activation module 10 may not be active. To indicate that computing device 2 is in a speech-recognition mode and is listening, icon 24 and the word "listening . . . " may be displayed in region 18-B. As shown in FIG. 1, icon 24 is in the image of a microphone.

Icon 24 indicates that computing device 2 is in a speech recognition mode (e.g., may receive audio data, such as spoken words). UID 4 displays a language element 26 in action region 18-B of GUI 16 that enables selection of a language the user is speaking such that speech recognition module 8 may transcribe the user's words in the correct language. GUI 16 includes pull-down menu 28 to provide an option to change the language speech recognition module 8 uses to transcribe the audio data. GUI 16 also includes virtual button 30 to provide an option to cancel the speech recognition mode of computing device 2. As shown in FIG. 1, virtual button 30 includes the word "done" to indicate its purpose of ending the speech-recognition mode. Pull-down menu 28 and virtual button 30 may both be user-interactive graphical elements, such as touch-targets, that may be triggered, toggled, or otherwise interacted with based on input received at UI device 4. For example, when the user is done speaking, the user may tap user interface 16 at or near the region of virtual button 30 to transition computing device 2 out of speech recognition mode.

Speech recognition module 8 may transcribe words that the user speaks or otherwise inputs into computing device 2. In one example, the user says "I would like to listen to jazz . . . ". Directly or indirectly, microphone 12 may provide information related to the audio data containing the spoken words to speech recognition module 8. Speech recognition module 8 may apply a language model corresponding to the selected language (e.g., English, as shown in language element 26) to transcribe the audio data. Speech recognition module 8 may provide information related to the transcription to UI device 4, which, in turn, may output characters of non-command text 20 at user interface 16 in edit region 18-A.

Speech recognition module 8 may provide the transcribed text to voice activation module 10. Voice activation module 10 may review the transcribed text for a voice-initiated action. In one example, voice activation module 10 may determines that the words "listen to" in the phrase "I would like to listen to jazz" indicate or describe a voice-initiated action. The words correspond to listening to something, which voice activation module 10 may determine means listening to an audio file. Based on the context of the statement, voice activation module 10 determines that the user wants to listen to jazz. Accordingly, voice activation module 10 may trigger an action that includes opening a media player and causing the media player to play jazz music. For example, computing device 2 may play an album stored on a memory device accessible by computing device 2 that is identified as of the genre jazz.

Responsive to identifying that the words "listen to" indicated a voice-initiated action, voice activation module 10 provides, directly or indirectly, UID 4 with information identifying "listen to" as corresponding to a voice-initiated action. UID 4 then changes the visual format of at least one graphical element displayed at user interface 16 to indicate that the voice-initiated action has been recognized. As shown in the example of FIG. 1, the spoken words "listen to" have been identified as a voice command.

FIG. 1 illustrates the graphical element related to the text "listen to" in a different visual format that the words "I would like to" and "jazz." FIG. 1 illustrates edit region 18-A displaying transcribed text characters 20 and voice-initiated action text 22 (also referred to herein as "command text 22"). Command text 22 is a graphical element that corresponds to a voice-initiated action transcribed by speech recognition module 8 and identified as a voice command by voice activation module 10. Command text 22 may be visually distinct from the non-command text in text characters 20. For example, FIG. 1 illustrates command text 22 (e.g., "LISTEN TO") as capitalized and underlined, whereas the non-command text 20 is generally lowercase and not underlined (e.g., "I would like to" and "jazz").

In another example, the visual format of icon 24 may change upon detection of a voice initiated action. In FIG. 1, icon 24 is in the image of a microphone. Icon 24 may initially have this image because computing device 2 is in a speech recognition mode. Responsive to voice activation module 10 determining that the audio data contains a voice initiated action, UID 4 may alter the visual format of icon 24. For example, UID 4 may alter icon 24 to have a visual format related to the action requested by the voice initiated action. In this example, icon 24 may change from the first visual format (e.g., a microphone) into a visual format related to the voice-initiated action (e.g., a play icon for playing a media file). In some examples, icon 24 may undergo an animated change between the two visual formats.

In this manner, techniques of this disclosure may enable computing device 2 to update speech recognition graphical user interface 16 in which one or both of command text 22 and icon 24 are presented in a different visual format based on audio data that includes an identified indication of the voice-initiated action. The techniques of the disclosure may enable computing device 2 to provide an indication that a voice-initiated action has been identified and will be, or is being, taken. The techniques may further enable a user to verify or confirm that the action to be taken is what the user intended computing device 2 to take with their voice command, or to cancel the action if it is incorrect or for any other reason. Computing device 2 configured with these features may provide the user with increased confidence that the voice-initiated action is being, or may be, implemented. This may improve overall user satisfaction with computing device 2 and its speech-recognition features. The techniques described may improve a user's experience with voice control of a computing device configured according to the various techniques of this disclosure.

Figure 2:
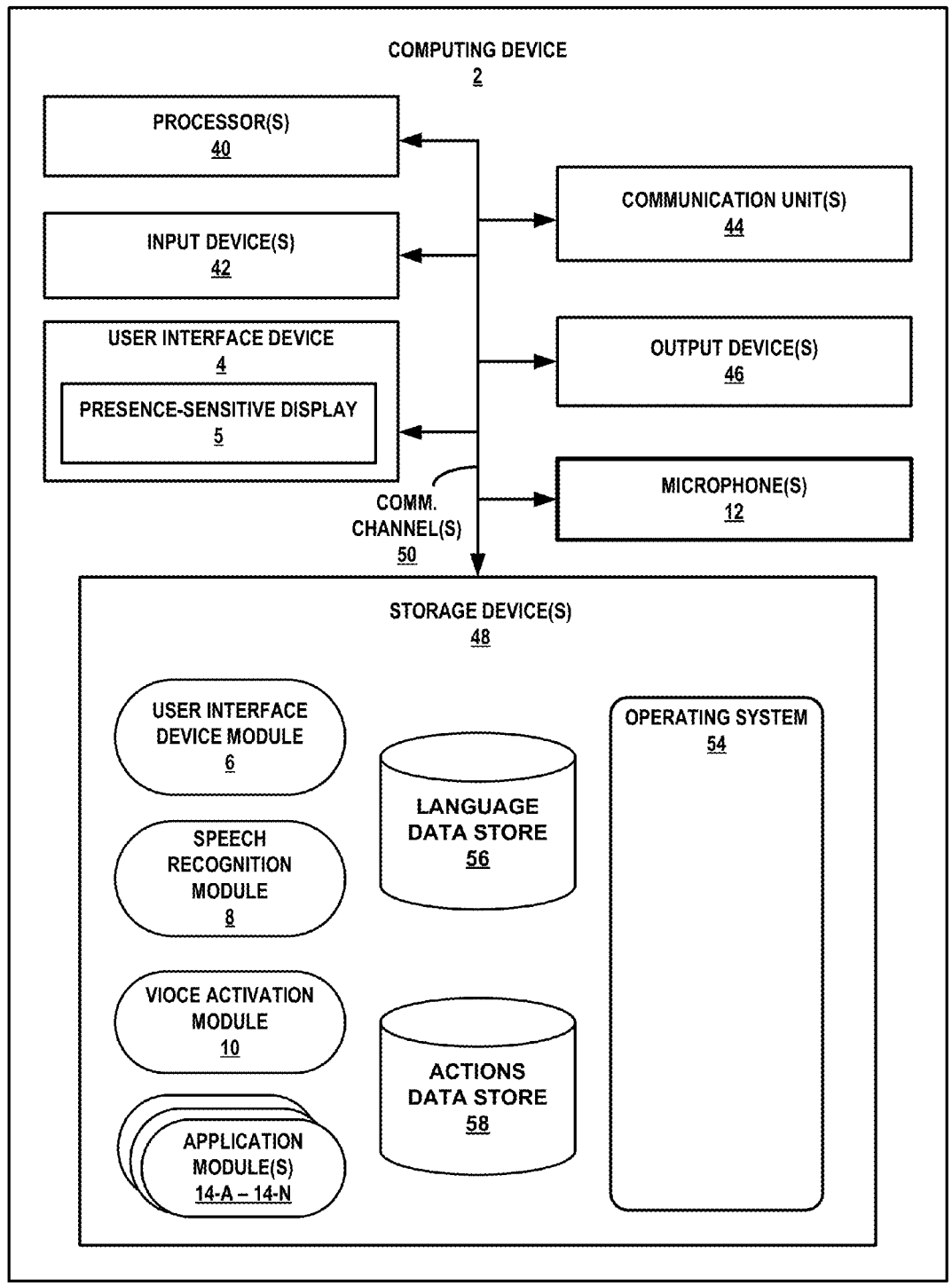
FIG. 2 is a block diagram illustrating an example computing device for providing a graphical user interface that includes a visual indication of a recognized voice-initiated action, in accordance with one or more aspects of the present disclosure.

FIG. 2 is a block diagram illustrating an example computing device 2 for providing a graphical user interface that includes a visual indication of a recognized voice-initiated action, in accordance with one or more aspects of the present disclosure. Computing device 2 of FIG. 2 is described below within the context of FIG. 1. FIG. 2 illustrates only one particular example of computing device 2, and many other examples of computing device 2 may be used in other instances. Other examples of computing device 2 may include a subset of the components included in example computing device 2 or may include additional components not shown in FIG. 2.

As shown in the example of FIG. 2, computing device 2 includes user interface device (UID) 4, one or more processors 40, one or more input devices 42, one or more microphones 12, one or more communication units 44, one or more output devices 46, and one or more storage devices 48. Storage devices 48 of computing device 2 also include UID module 6, speech recognition module 8, voice activation module 10, application modules 14A-14N (collectively referred to as "application modules 14"), language database 56, and actions database 58. One or more communication channels 50 may interconnect each of the components 4, 40, 42, 44, 46, and 48 for inter-component communications (physically, communicatively, and/or operatively). In some examples, communication channels 50 may include a system bus, a network connection, an inter-process communication data structure, or any other technique for communicating data.

One or more input devices 42 of computing device 2 may receive input. Examples of input are tactile, motion, audio, and video input. Input devices 42 of computing device 2, in one example, includes a presence-sensitive display 5, touch-sensitive screen, mouse, keyboard, voice responsive system, video camera, microphone (such as microphone 12), or any other type of device for detecting input from a human or machine.

One or more output devices 46 of computing device 2 may generate output. Examples of output are tactile, audio, electromagnetic, and video output. Output devices 46 of computing device 2, in one example, includes a presence-sensitive display, speaker, cathode ray tube (CRT) monitor, liquid crystal display (LCD), motor, actuator, electromagnet, piezoelectric sensor, or any other type of device for generating output to a human or machine. Output devices 46 may utilize one or more of a sound card or video graphics adapter card to produce auditory or visual output, respectively.

One or more communication units 44 of computing device 2 may communicate with external devices via one or more networks by transmitting and/or receiving network signals on the one or more networks. Communication units 44 may connect to any public or private communication network. For example, computing device 2 may use communication unit 44 to transmit and/or receive radio signals on a radio network such as a cellular radio network. Likewise, communication units 44 may transmit and/or receive satellite signals on a Global Navigation Satellite System (GNNS) network such as the Global Positioning System (GPS). Examples of communication unit 44 include a network interface card (e.g., an Ethernet card), an optical transceiver, a radio frequency transceiver, a GPS receiver, or any other type of device that can send or receive information. Other examples of communication units 44 may include short wave radios, cellular data radios, wireless Ethernet network radios, as well as universal serial bus (USB) controllers.

In some examples, UID 4 of computing device 2 may include functionality of input devices 42 and/or output devices 46. In the example of FIG. 2, UID 4 may be or may include presence-sensitive display 5. In some examples, presence-sensitive display 5 may detect an object at and/or near presence-sensitive display 5. As one example range, presence-sensitive display 5 may detect an object, such as a finger or stylus that is within six centimeters or less of presence-sensitive display 5. Presence-sensitive display 5 may determine a location (e.g., an (x,y) coordinate) of presence-sensitive display 5 at which the object was detected. In another example range, a presence-sensitive display 5 may detect an object fifteen centimeters or less from the presence-sensitive display 5 and other ranges are also possible. The presence-sensitive display 5 may determine the location of the screen selected by a user's finger using capacitive, inductive, and/or optical recognition techniques. In some examples, presence sensitive display 5 provides output to a user using tactile, audio, or video stimuli as described with respect to output device 46. In the example of FIG. 2, UID 4 presents a user interface (such as user interface 16 of FIG. 1) at presence-sensitive display 5 of UID 4.

While illustrated as an internal component of computing device 2, UID 4 also represents an external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more storage devices 48 within computing device 2 may store information for processing during operation of computing device 2 (e.g., computing device 2 may store data in language data stores 56 and actions data stores 58 accessed by speech recognition module 8 and voice activation module 10 during execution at computing device 2). In some examples, storage device 48 functions as a temporary memory, meaning that storage device 48 is not used for long-term storage. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 6, 8, 10, and 14.

One or more processors 40 may implement functionality and/or execute instructions within computing device 2. For example, processors 40 on computing device 2 may receive and execute instructions stored by storage devices 48 that execute the functionality of UID module 6, speech recognition module 8, voice activation module 10, and application modules 14. These instructions executed by processors 40 may cause computing device 2 to store information within storage devices 48 during program execution. Processors 40 may execute instructions in modules 6, 8, and 10 to cause UID 4 to display user interface 16 with a graphical element that has a visual format different from a previous visual format upon computing device 2 identifying a voice-initiated action. That is, modules 6, 8, and 10 may be operable by processors 40 to perform various actions, including transcribing received audio data, analyzing the audio data for voice-initiated actions, and updating presence-sensitive display 5 of UID 4 to change a visual format of a graphical element associated with the voice-initiated action. Further, UID module 6 may be operable by processors 40 to perform various actions, including receiving an indication of a gesture at locations of presence-sensitive display 5 of UID 4 and causing UID 4 to present user interface 14 at presence-sensitive display 5 of UID 4.

In accordance with aspects of this disclosure, computing device 2 of FIG. 2 may output, at user interface device 4, a speech recognition GUI having at least one element in a first visual format. Microphone 12 of computing device 2 receives audio data. Prior to performing a voice-initiated action based on the audio data and while receiving additional audio data, UID 4 outputs an updated speech recognition GUI in which the at least one element is presented in a second visual format different from the first visual format to provide an indication that the voice-initiated action has been identified.

Speech recognition module 8 of computing device 2 may receive, from microphone 12, for example, one or more indications of audio data detected at microphone 12. Generally, microphone 12 may provide received audio data or an indication of audio data, speech recognition module 8 may receive the audio data from microphone 12. Speech recognition module 8 may determine if the information corresponding to the audio data received from microphone 12 includes speech. Using speech recognition techniques, speech recognition module 8 may transcribe the audio data. Speech recognition module 8 may use language data store 6 to transcribe the audio data if the audio data does include speech.

Speech recognition module 8 may also determine if the audio data includes the voice of a particular user. In some examples, if the audio data corresponds to a human voice, speech recognition module 8 determines if the voice belongs to a previous user of computing device 2. If the voice in the audio data does belong to a previous user, speech recognition module 8 may modify the speech recognition techniques based on certain characteristics of the user's speech. These characteristics may include tone, accent, rhythm, flow, articulation, pitch, resonance, or other characteristics of speech. Taking into considerations known characteristics about the user's speech, speech recognition module 8 may improve results in transcribing the audio data for that user.

In examples where computing device 2 has more than one user that uses speech recognition, computing device 2 may have profiles for each user. Speech recognition module 8 may update a profile for a user, responsive to receiving additional voice input from that user, in order to improve speech recognition for the user in the future. That is, speech recognition module 8 may adapt to particular characteristics of each user of computing device 2. Speech recognition module 8 may adapt to each user by using machine learning techniques. These voice recognition features of speech recognition module 8 can be optional for each user of computing device 2. For example, computing device 2 may have to receive an indication that a user opts-into the adaptable speech recognition before speech recognition module 8 may store, analyze, or otherwise process information related to the particular characteristics of the user's speech.

In some examples, speech recognition module 8 transcribes the speech in the audio data that speech recognition module 8 received, directly or indirectly, from microphone 12. Speech recognition module 8 may provide text data related to the transcribed speech to UI device 4. For example, speech recognition module 8 provides the characters of the transcribed text to UI device 4. UI device 4 may output, for display, the text related to the transcribed speech that is identified in the information related to the transcribed speech at user interface 16.

Voice activation module 10 of computing device 2 may receive, from speech recognition module 8, for example, textual characters of transcribed speech from audio data detected at microphone 12. Voice activation module 10 may analyze the transcribed text or the audio data to determine if it includes a keyword or phrase that activates a voice-initiated action. In some examples, voice activation module 10 compares words or phrases from the audio data to a list of actions that can be triggered by voice activation. For example, the list of actions may be a list of verbs, such as run, play, close, open, start, email, or the like. Voice activation module 10 may use actions data store 58 to determine if a word or phrase corresponds to an action. That is, voice activation module 10 may compare words or phrases from the audio data to actions data store 58. Actions data store 58 may contain data of words or phrases that are associated with an action.

Once voice activation module 10 identifies a word or phrase that activates a voice-initiated action, voice activation module 10 causes UID 4 to display, within user interface 16 a graphical element in a second, different visual format to indicate that a voice-initiated action has been successfully recognized. For example, when voice activation module 10 determines a word in the transcribed text corresponds to a voice-initiated action, UID 4 changes output of the word from a first visual format (which may have been the same visual format as that of the rest of the transcribed text) into a second, different visual format. For example, the keywords or phrases related to the voice-initiated action are immediately, or approximately immediately, stylized differently in display of the transcription to indicate computing device 2 recognizes the voice-initiated action. In another example, an icon or other image morphs from one visual format to another visual format, which may be based on the identified voice-initiated action, when computing device 2 identifies the voice-initiated action.

Computing device 2 may further include one or more application modules 14-A through 14-N. Application modules 14 may include any other application that computing device 2 may execute in addition to the other modules specifically described in this disclosure. For example, application modules 14 may include a web browser, a media player, a file system, a map program, or any other number of applications or features that computing device 2 may include.

Techniques described herein may enable computing device 2 to improve a user's experience when using voice commands to control computing device 2. For example, techniques of this disclosure may enable computing device 2 to output a visual indication that it has accurately identified a voice-initiated action. For example, computing device 2 outputs a graphical element associated with the voice-initiated action in a visual format different from the visual format of similar graphical elements that are not associated with a voice-initiated action. Further, computing device 2 indicates that the voice-initiated action has been recognized, which may provide a user with increased confidence that computing device 2 may implement or is implementing the correct voice-initiated action. Computing device 2 outputting a graphical element in the second visual format may improve overall user satisfaction with computing device 2 and its speech-recognition features.

Techniques described herein may further enable computing device 2 to provide a user with an option to confirm whether computing device 2 correctly determined an action using the audio data. In some examples, computing device 2 may cancel the action if it receives an indication that it did not correctly determine the action. In another example, computing device 2 perform the voice-initiated action only upon receiving an indication that computing device 2 correctly determined the action. Techniques described herein may improve the performance and overall ease of use of computing device 2.

Figure 3:
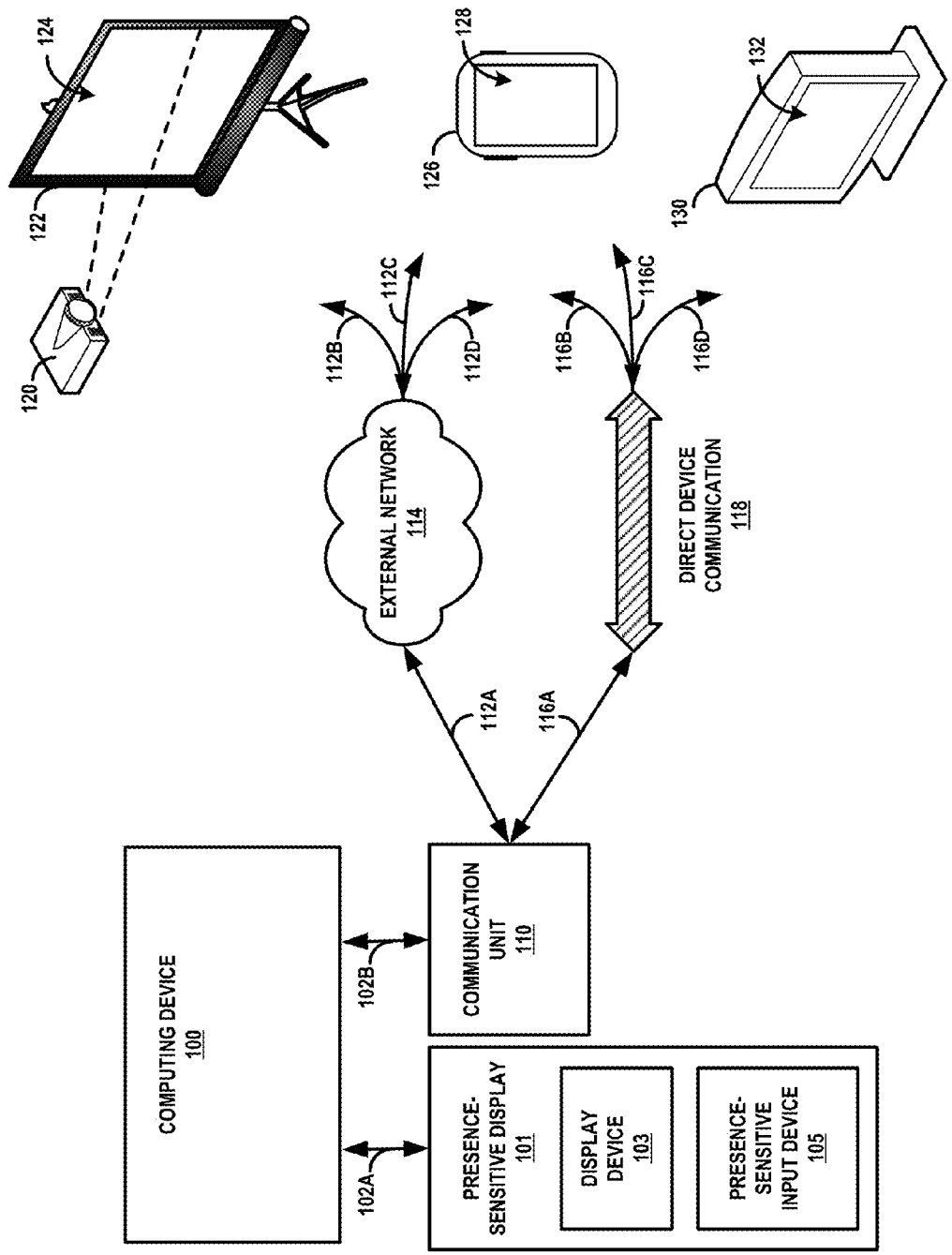
FIG. 3 is a block diagram illustrating an example computing device that outputs graphical content for display at a remote device, in accordance with one or more techniques of the present disclosure.

FIG. 3 is a block diagram illustrating an example computing device 100 that outputs graphical content for display at a remote device, in accordance with one or more techniques of the present disclosure. Graphical content, generally, may include any visual information that may be output for display, such as text, images, a group of moving images, etc. The example shown in FIG. 3 includes computing device 100, presence-sensitive display 101, communication unit 110, projector 120, projector screen 122, mobile device 126, and visual display device 130. Although shown for purposes of example in FIGS. 1 and 2 as a stand-alone computing device 2, a computing device such as computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 101, such as an example of user interface device 4 as shown in FIG. 1, may include display device 103 and presence-sensitive input device 105. Display device 103 may, for example, receive data from computing device 100 and display graphical content associated with the data. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, and the like, such as those shown in FIGS. 1 and 2.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of presence-sensitive display 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 116A-116D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a graphical keyboard for display at presence-sensitive display 132. For instance, computing device 100 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing a gesture at presence-sensitive display 132 (e.g., at a region of presence-sensitive display 132 that outputs the graphical keyboard), visual display device 130 may send an indication of the gesture to computing device 100 using external network 114. Communication unit 110 of may receive the indication of the gesture, and send the indication to computing device 100.

In response to receiving speech included in audio data, computing device 100 may transcribe the speech into text. Computing device 100 may cause one of the display devices, such as presence-sensitive input display 105, projector 120, presence-sensitive display 128, or presence-sensitive display 132 to output a graphical element in a first visual format, which may include at least part of the transcribed text. Computing device 100 may determine that the speech includes a voice-initiated action and cause one of the display devices 105, 120, 128, or 132 to output a graphical element related to the voice-initiated action. The graphical element may be outputted in a second visual format, different from the first visual format, to indicate that computing device 100 has detected the voice-initiated action. Computing device 100 may perform the voice-initiated action.

FIGS. 4A-4D are screenshots illustrating example graphical user interfaces (GUIs) of a computing device for a navigation example, in accordance with one or more techniques of the present disclosure. The computing device 200 of FIGS. 4A-4D may be any computing device as discussed above with respect to FIGS. 1-3, including a mobile computing device. Furthermore, computing device 200 may be configured to include any subset of the features and techniques described herein, as well as additional features and techniques. FIGS. 4A-4D include graphical elements 204-A through 204-C (collectively referred to as "graphical element 204") that can have different visual formats.

Figure 4B:
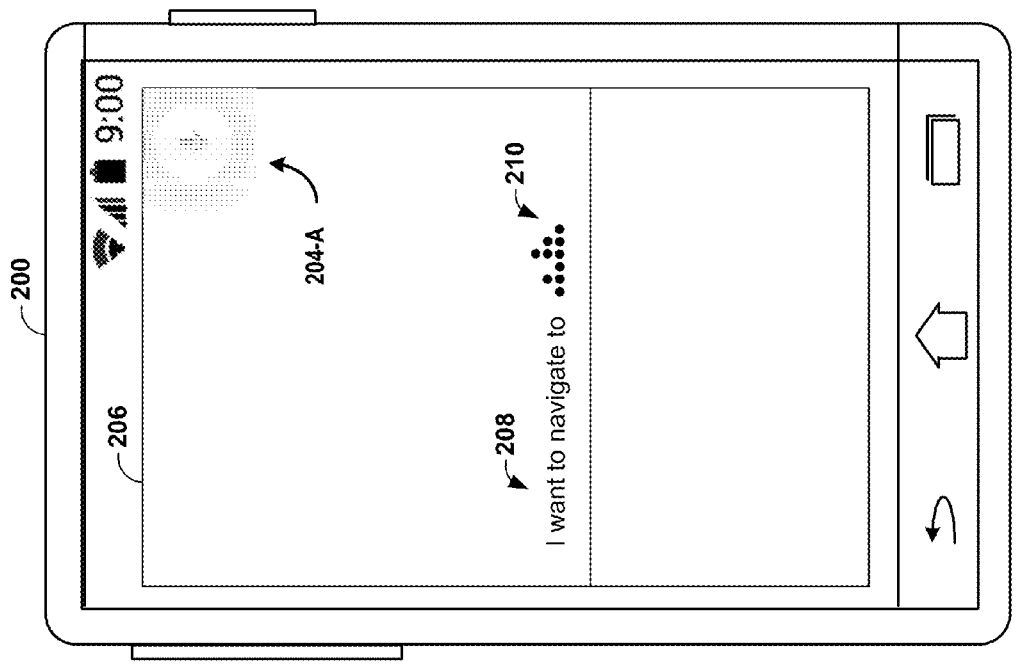
FIGS. 4A-4D are screenshots illustrating example graphical user interfaces (GUIs) of a computing device for a navigation example, in accordance with one or more techniques of the present disclosure.
Figure 4A:
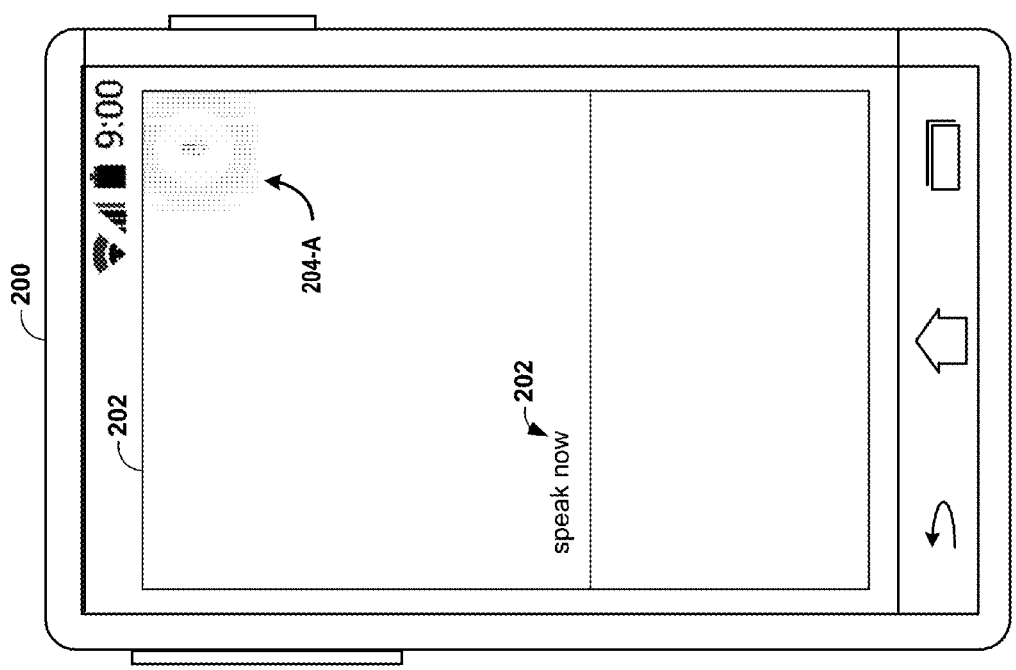

FIG. 4A depicts computing device 200 having a graphical user interface (GUI) 202 and operating a state where computing device 200 may receive audio data. For example, a microphone, such as microphone 12 of FIGS. 1 and 2, may be initialized and able to detect audio data, including speech. GUI 202 may be a speech recognition GUI. GUI 202 includes graphical elements 202 and 204-A. Graphical element 202 is text and says "speak now," which may indicate that computing device 200 is able to receive audio data. Graphical element 204-A is an icon representing a microphone. Thus, graphical element 204-A may indicate that computing device 200 is able to perform an action of recording audio data.

FIG. 4B illustrates computing device 200 outputting GUI 206 in response to receiving audio data in FIG. 4A. GUI 206 includes graphical elements 204-A, 208, and 210. In this example, computing device 200 has transcribed the received audio data, using speech recognition module 8 and language data store 56, for example. Computing device 200 may still be receiving additional audio data, as indicated by the microphone icon 204-A. The transcribed audio data is outputted as text in graphical element 208 and includes the words "I want to navigate to." Graphical element 210 may further indicate that computing device 200 may still be receiving additional audio data or that speech recognition module 8 may still be transcribing received audio data.

GUI 206 includes graphical element 208 in a first visual format. That is, graphical element 208 includes text having a particular font, size, color, position, or the like. The words "navigate to" are included as part of graphical element 208 and are presented in the first visual format. Similarly, GUI 206 includes graphical element 204-A in a first visual format. The first visual format of graphical element 204-A is an icon that includes an image of a microphone. Graphical element 204-A may indicate an action computing device 200 is performing or is going to perform.

Figure 4D:
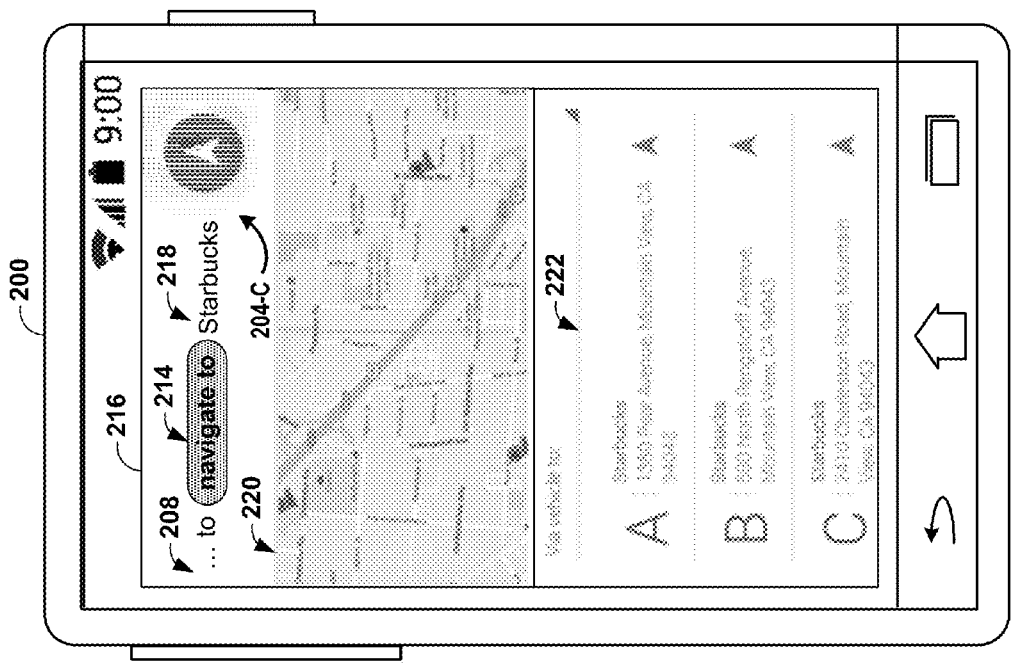
Figure 4C:
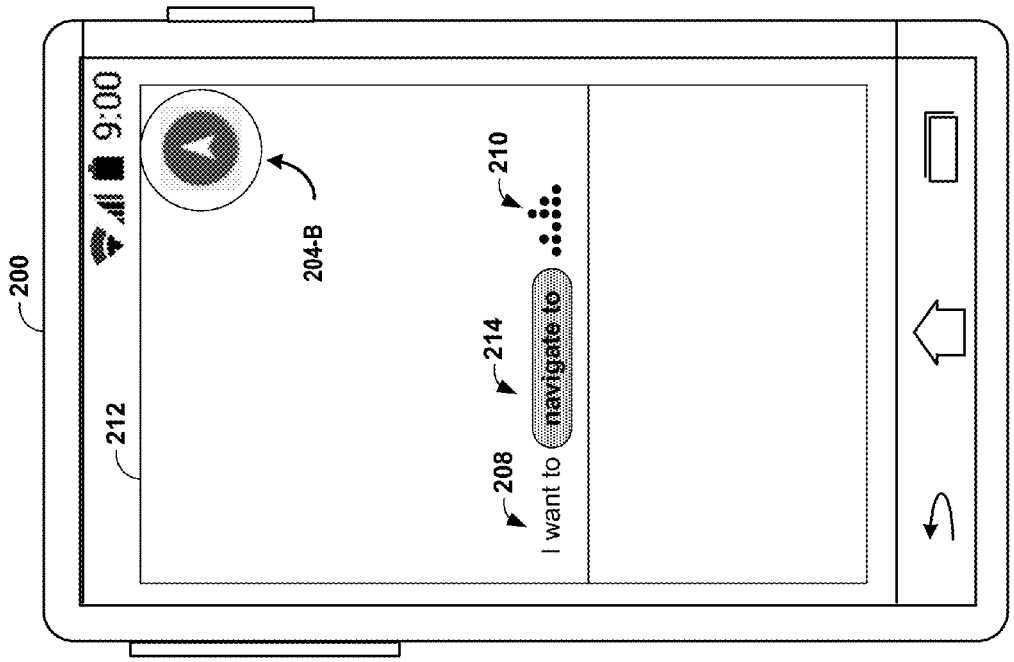

FIG. 4C depicts computing device 200 outputting an updated GUI 212. Updated GUI 212 includes graphical elements 204-B, 208, 210, and 214. In this example, voice activation module 10 may have analyzed the transcribed audio data and identified a voice-initiated action. For example, voice activation module 10 may have compared one or more words or phrases in transcribed text shown in graphical element 208 to an actions data store 58. In this example, voice activation module 10 determined that the phrase "navigate to" corresponded to a voice-initiated action instruction. In response to detecting the action instruction, voice activation module 10 may have instructed UID module 6 to output updated GUI 212, at for example, presence-sensitive display 5.

Updated GUI 212 includes an updated graphical element 204-B having a second visual format. Graphical element 204-B is an icon that depicts an image of an arrow, which may be associated with a navigation feature of computing device 200. In contrast, graphical element 204-A is an icon that depicts a microphone. Thus, graphical element 204-B has a second visual format while graphical element 204-A has a first visual format. The icon of graphical element 204-B indicates that computing device 200 may perform a voice-initiate action, such as performing a navigation function.

Likewise, updated GUI 202 also includes an updated graphical element 214. Graphical element 214 includes the words "navigate to" having a second visual format than in GUI 206. In GUI 202, the second visual format of graphical element 214 includes highlighting provided by a colored or shaded shape around the words and bolding of the words. In other examples, other characteristics or visual aspects of "navigate to" may be changed from the first visual format to the second visual format, including size, color, font, style, position, or the like. Graphical element 214 provides an indication that computing device 200 has recognized a voice-initiated action in the audio data. In some examples, GUI 212 provides an additional graphical element that indicates computing device 2 needs an indication of confirmation before performing the voice-initiated action.

In FIG. 4D, computing device 200 has continued to receive and transcribe audio data since displaying GUI 212. Computing device 200 outputs an updated GUI 216. GUI 216 includes the graphical elements 204-C, 208, 214, 218, 220, and 222. Graphical element 204-C has retaken the first visual format, an image of a microphone, because computing device 200 has performed the voice-initiated action and is continuing to detect audio data.

Computing device 200 received and transcribed the additional word "Starbucks" in FIG. 4D. Altogether, in this example, computing device 200 has detected and transcribed the sentence "I want to navigate to Starbucks." Voice activation module 10 may have determined that "Starbucks" is a place to which the speaker (e.g., a user) wishes to navigate. Computing device 200 has performed an action the voice-initiated action identified, navigating to Starbucks. Thus, computing device 200 has executed a navigation application and performed a search for Starbucks. In one example, computing device 200 uses contextual information to determine what the voice-initiated action is and how to perform it. For example, computing device 200 may have used a current location of computing device 200 to upon which to center the search for local Starbucks locations.

Graphical element 208 may include only part of the transcribed text in order that the graphical element representing the voice-initiated action, graphical element 214, may be included in GUI 216. GUI 216 includes a map graphical element 220 showing Starbucks locations. Graphical element 222 may include an interactive list of the Starbucks locations.

In this manner, graphical elements 204-B and 214 may be updated to indicate that computing device 200 has identified a voice-initiated action and may perform the voice-initiated action. Computing device 200 configured according to techniques described herein may provide a user with an improved experience of interacting with computing device 200 via voice commands.

Figure 5B:
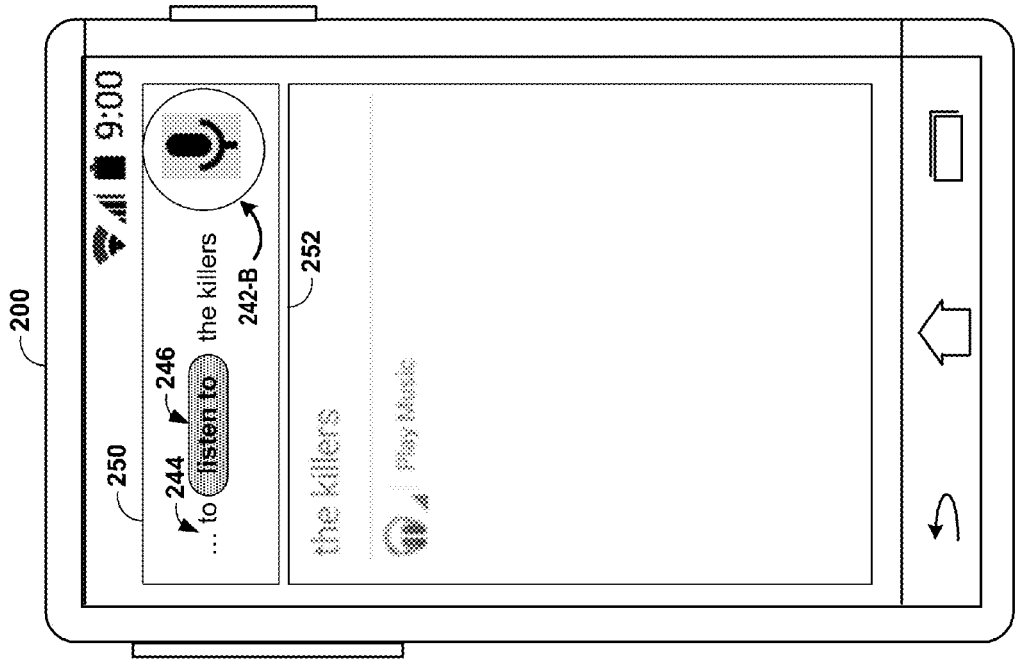
FIGS. 5A-5B are screenshots illustrating example GUIs of a computing device for a media play example, in accordance with one or more techniques of the present disclosure.
Figure 5A:
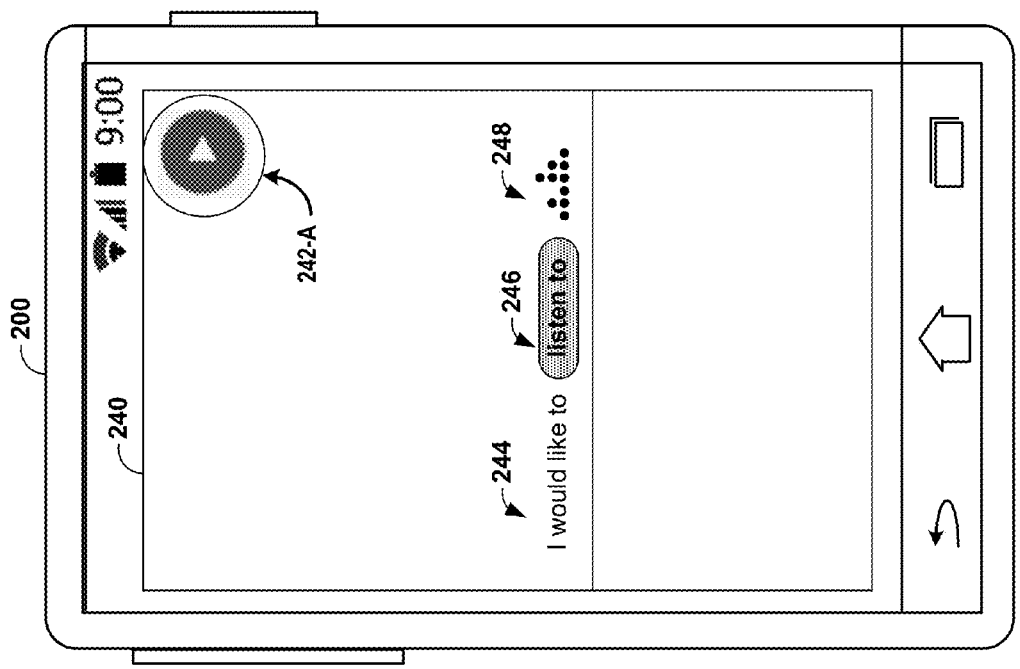

FIGS. 5A-5B are screenshots illustrating example GUIs of computing device 200 for a media play example, in accordance with one or more techniques of the present disclosure. The computing device 200 of FIGS. 5A and 5B may be any computing device as discussed above with respect to FIGS. 1-4D, including a mobile computing device. Furthermore, computing device 200 may be configured to include any subset of the features and techniques described herein, as well as additional features and techniques.

FIG. 5A illustrates computing device 200 outputting GUI 240 including graphical elements 242, 244, 246, and 248. Graphical element 244 corresponds to text that speech recognition module 8 transcribed, "I would like to," and is presented in a first visual format. Graphical element 246 is text of a phrase that voice activation module 10 identified as a voice-initiated action, "listen to," and is presented in a second visual format, different from the first visual format of graphical element 244. The voice-initiated action may be playing a media file, for example. Graphical element 242-A is an icon that may represent the voice-initiated action, such as having an appearance of a play button. Graphical element 242-A represents a play button because voice activation module 10 has determined that computing device 200 received a voice instruction to play media that includes an audio component. Graphical element 248 provides an indication that computing device 200 may still be receiving, transcribing, or analyzing audio data.

FIG. 5B illustrates computing device 200 outputting GUI 250 that includes graphical elements 242-B, 244, 246, and 248. Graphical element 242-B has a visual format corresponding to an image of a microphone, to indicate computing device 200 is able to receive audio data. Graphical element 242-B no longer has the visual format corresponding to the voice-initiated action, that is, the image of a play button, because computing device 200 has already performed an action related to the voice-initiated action, which may be the voice-initiated action.

Voice activation module 10 has determined that the voice-initiated action "listen to" applies to the words "the killers," which may be a band. Computing device 200 may have determined an application to play a media file that includes an audio component, such as a video or audio player. Computing device 200 may also have determined a media file that satisfies a requirement of satisfying "the killers" requirement, such as a music file stored on a local storage device, such as storage device 48 of FIG. 2, or accessible over a network, such as the Internet. Computing device 200 has performed the task of executing an application to play such a file. The application may be, for example, a media player application, which instructs UID 4 to output GUI 250 including graphical element 252 related to a playlist for the media player application.

Figure 6:
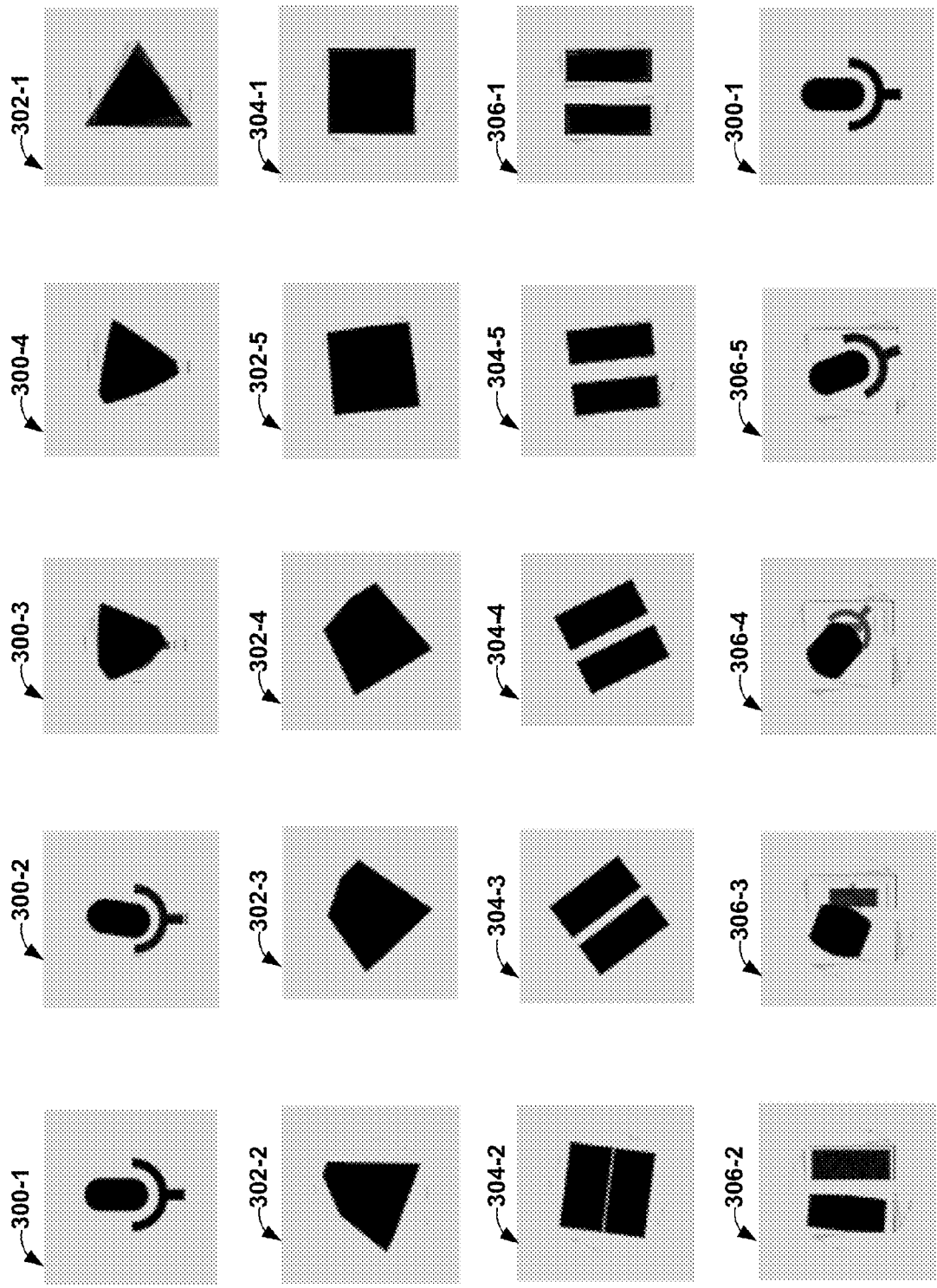
FIG. 6 is a conceptual diagram illustrating a series of example visual formats that a element may morph into based on different voice-initiated actions, in accordance with one or more techniques of the present disclosure.

FIG. 6 is a conceptual diagram illustrating a series of example visual formats that a element may morph into based on different voice-initiated actions, in accordance with one or more techniques of the present disclosure. The element may be a graphical element such as graphical element 204 and 242 of FIGS. 4A-4D, 5A, and 5B. The element may change visual formats represented by images 300-1-300-4, 302-1-302-5, 304-1-304-5, and 306-1-306-5.

Image 300-1 represents a microphone and may be a first visual format of a user interface element. When the element has the visual format of image 300-1, the computing device, such as computing device 2, may be able to receive audio data from an input device, such as microphone 12. Responsive to computing device 200 determining that a voice-initiated action has been received corresponding to a command to play a media file, the visual format of the element may change from image 300-1 to image 302-1. In some examples, image 300-1 morphs into image 302-1, in what may be an animation. For example, image 300-1 turns into image 302-1, and in doing so, the element takes the intermediate images 300-2, 300-3, and 300-4.

Similarly, responsive to computing device 2 determining that a voice-initiated action has been received to stop playing the media file after it has begun playing, computing device 2 may cause the visual format of the element to change from image 302-1 to image 304-1, an image corresponding to stop. Image 302-1 may take intermediate images 302-2, 302-3, 302-4, and 302-5 as it morphs into image 304-1.

Likewise, responsive to computing device 2 determining that a voice-initiated action has been received to pause playing the media file, computing device 2 may cause the visual format of the element to change from image 304-1 to image 306-1, an image corresponding to pause. Image 304-1 may take intermediate images 304-2, 304-3, 304-4, and 304-5 as it morphs into image 306-1.

Furthermore, responsive to computing device 2 determining that no additional voice-initiated actions have been received for a predetermined time period, computing device 2 may cause the visual format of the element to change from image 306-1 back to image 300-1, the image corresponding to audio recording. Image 306-1 may take intermediate images 306-2, 306-3, 306-4, and 306-5 as it morphs into image 300-1. In other examples, the element may morph or change into other visual formats having different images.

Figure 7:
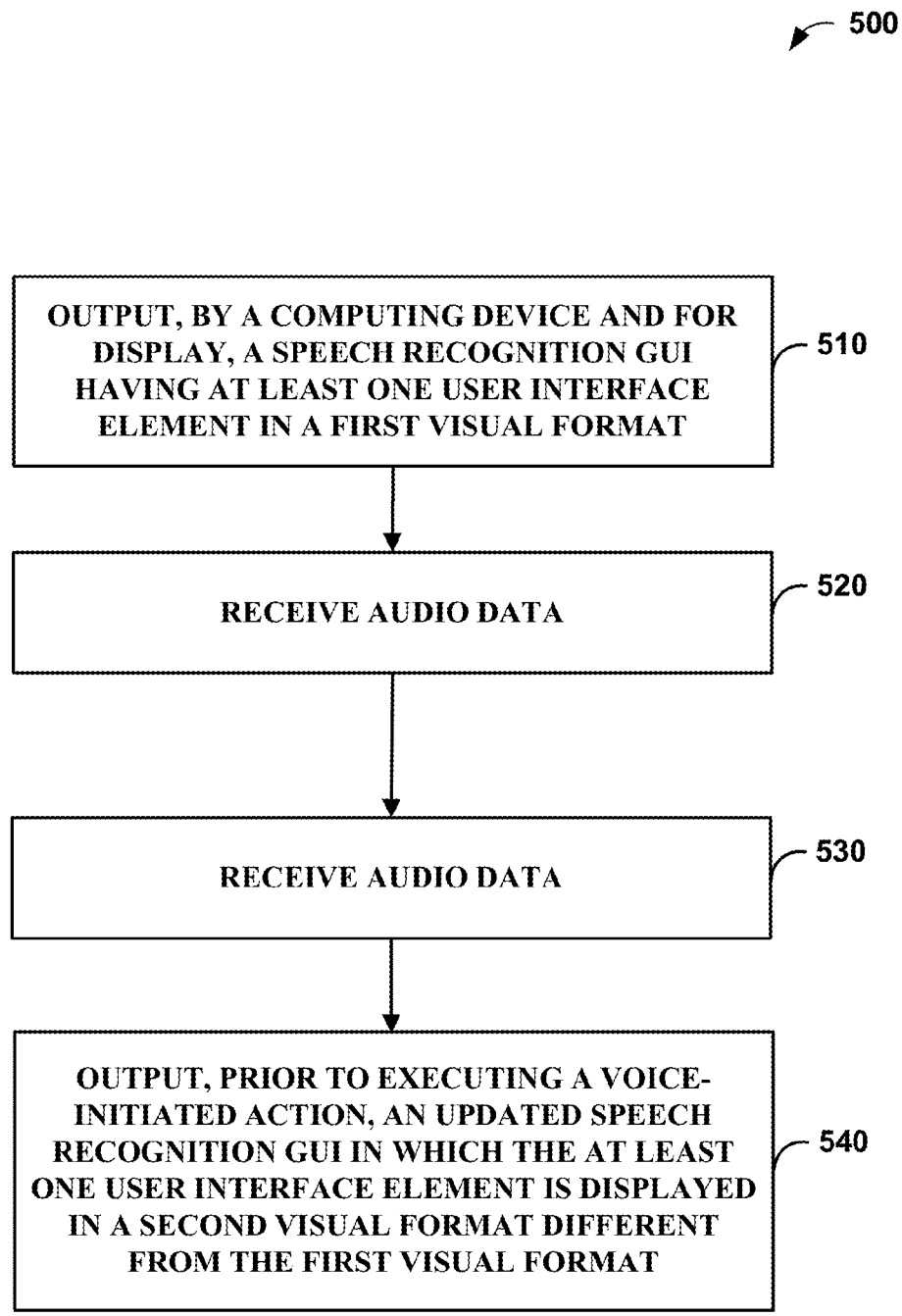
FIG. 7 is a flowchart illustrating an example process for a computing device to visually confirm a recognized voice-initiated action, in accordance with one or more techniques of the present disclosure.

FIG. 7 is a flowchart illustrating an example process 500 for a computing device to visually confirm a recognized voice-initiated action, in accordance with one or more techniques of the present disclosure. Process 500 will be discussed in terms of computing device 2 of FIGS. 1 and 2 performing process 500. However, any computing device, such as computing devices 100 or 200 of FIGS. 3, 4A-4D, 5A, and 5D may perform process 500.

Process 500 includes outputting, by computing device 2 and for display, a speech recognition graphical user interface (GUI), such as GUI 16 or 202, having at least one element in a first visual format (510). The element may be an icon or text, for example. The first visual format may be of a first image, such as microphone image 300-1, or one or more words, such as non-command text 208.

Process 500 further includes receiving, by computing device 2, audio data (520). For example, microphone 12 detects ambient noise. Process 500 may further include determining, by the computing device, a voice-initiated action based on the audio data (530). Speech recognition module 8, for example, may determine the voice-initiated action from the audio data. Examples of voice-initiated actions may include send text messages, listen to music, get directions, call businesses, call contacts, send email, view a map, go to websites, write a note, redial the last number, open an app, call voicemail, read appointments, query phone status, search web, check signal strength, check network, check battery, or any other action.

Process 500 may further include computing device 2 transcribing the audio data and outputting, while receiving additional audio data and prior to executing a voice-initiated action based on the audio data, and for display, an updated speech recognition GUI in which the at least one element is displayed in a second visual format, different from the first visual format, to indicate that the voice-initiated action has been identified, such as graphical element 214 shown in FIG. 4C (540).

In some examples, outputting the speech recognition GUI further includes outputting a portion of the transcribed audio data, and wherein outputting the updated speech recognition GUI further comprises cropping at least the portion of the transcribed audio data such that the one or more words of the transcribed audio data related to the voice-initiated action are displayed. In some examples with computing device 2 having a relatively small screen, the displayed transcribed text may focus more on the words corresponding to the voice-initiated action.

Process 500 further includes outputting, prior to performing a voice-initiated action based on the audio data and while receiving additional audio data, an updated speech recognition GUI, such as GUI 212, in which the at least one element is presented in a second visual format different from the first visual format to provide an indication that the voice-initiated action has been identified. In some examples, the second visual format is different from the first visual format in one or more of image, color, font, size, highlighting, style, and position.

Process 500 may also include computing device 2 analyzing the audio data to determine the voice-initiated action. Computing device 2 may analyze the transcription of the audio data to determine the voice-initiated action based at least partially on a comparison of a word or a phrase of the transcribed audio data to a database of actions. Computing device 2 may look for keywords in the transcribed audio data. For example, computing device 2 may detect at least one verb in the transcription of the audio data and compare the at least one verb to a set of verbs, wherein each verb in the set of verbs corresponds to a voice-initiated action. For example, the set of verbs may include "listen to" and "play," which both may be correlated with a voice-initiated action to play a media file with an audio component.

In some examples, computing device 2 determines a context of computing device 2, such as a current location of computing device 2, what applications computing device 2 is currently or recently executing, time of day, identity of the user issuing the voice command, or any other contextual information. Computing device 2 may use the contextual information to at least partially determine the voice-initiated action. In some examples, computing device 2 captures more audio data before determining the voice-initiated action. If subsequent words change the meaning of the voice-initiated action, computing device 2 may update the visual format of the element to reflect the new meaning. In some examples, computing device 2 may use the context to make subsequent decisions, such as for which location of a chain restaurant to get directions.

In some examples, the first visual format of the at least one element has an image representative of a speech recognition mode, and wherein the second visual format of the at least one element has an image representative of a voice-initiated action. For example, the element represented in FIG. 6 may have a first visual format 300-1 representative of a speech recognition mode (e.g., a microphone) and a second visual format 302-1 representative of a voice-initiated action (e.g., play a media file). In some examples, the image representative of the speech recognition mode morphs into the image representative of the voice-initiated action. In other examples, any element having a first visual format may morph into a second visual format.

Computing device 2 may actually perform the voice-initiated action based on the audio data. That is, responsive to computing device 2 determining the voice-initiated action is to obtain directions to an address, computing device 2 performs the task, such as executing a map application and searching for directions. Computing device 2 may determine a confidence threshold that the identified voice-initiated action is correct. If the confidence level for a particular voice-initiated action is below the confidence threshold, computing device 2 may request user confirmation before proceeding with performing the voice-initiated action.

In some examples, computing device 2 performs the voice-initiated action only in response to receiving an indication confirming the voice-initiated action is correct. For example, computing device 2 may output for display a prompt requesting feedback that the identified voice-initiated action is correct before computing device 2 performs the action. In some cases, computing device 2 updates the speech recognition GUI such that the element is presented in the first visual format in response to receiving an indication of a cancellation input, or in response to not receiving feedback that the identified voice-initiated action is correct within a predetermined time period. In some examples, the speech recognition GUI includes an interactive graphical element for cancelling a voice-initiated action.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described in this disclosure. These and other embodiments are within the scope of the following claims.

The invention claimed is:

1. A method comprising:
outputting, by a first application executing at a computing device and for display, a speech recognition graphical user interface (GUI) having at least one non-textual element in a first visual format;
receiving, by the first application executing at the computing device, first audio data of a voice command that indicates one or more words of the voice command;
determining, by the first application executing at the computing device, based on the one or more words of the voice command, a voice-initiated action indicated by the first audio data of the voice command, wherein the voice-initiated action is a particular voice-initiated action from a plurality of voice-initiated actions and the voice-initiated action is associated with a second application that is different than the first application;
responsive to determining the voice-initiated action indicated by the first audio data of the voice command, and while receiving second audio data of the voice command that indicates one or more additional words of the voice command, and prior to executing the second application to perform the voice command, outputting, by the first application executing at the computing device, for display, an updated speech recognition GUI in which the at least one non-textual element, from the speech recognition GUI, transitions from being displayed in the first visual format to being displayed in a second visual format, different from the first visual format, indicating that the voice-initiated action is the particular voice-initiated action from the plurality of voice-initiated actions that has been determined from the first audio data of the voice command, wherein:
the first visual format of the at least one non-textual element is a first image representative of a speech recognition mode of the first application,
the second visual format of the at least one non-textual element is a second image that replaces the first image and corresponds to the voice-initiated action from the plurality of voice-initiated actions, and
the second image is different from other images corresponding to one or more other voice-initiated actions from the plurality of voice-initiated actions; and
after outputting the updated speech recognition GUI and after receiving the second audio data of the voice command, executing, by the computing device, based on the first audio data and the second audio data, the second application that performs the voice-initiated action indicated by the voice command.

2. The method of claim 1, further comprising:
determining, by the computing device, based on the first audio data and the second audio data, a transcription comprising the one or more words of the voice command and the one or more additional words of the voice command,
wherein outputting the updated speech recognition GUI comprises outputting at least a portion of the transcription.

3. The method of claim 2,
wherein outputting the updated speech recognition GUI further comprises outputting the one or more words of the voice command and refraining from outputting the one or more additional words of the voice command.

4. The method of claim 1, wherein the second visual format is further different from the first visual format in at least one of color, font, size, highlighting, style, or position.

5. The method of claim 1, wherein outputting the updated speech recognition GUI comprises outputting the first image representative of the speech recognition mode with an animation that morphs into the second image in response to determining the voice-initiated action based on the first audio data.

6. The method of claim 1, further comprising responsive to determining the voice-initiated action based on the first audio data, performing, by the computing device, based on the second audio data, the voice-initiated action.

7. The method of claim 6, wherein the voice-initiated action is performed in response to receiving, by the computing device, an indication confirming that the voice-initiated action is correct.

8. The method of claim 1, wherein determining the voice-initiated action further comprises determining the voice-initiated action based at least partially on a comparison of at least one of the one or more words of the voice command to a preconfigured set of actions.

9. The method of claim 1, wherein determining the voice-initiated action further comprises:
identifying, by the computing device, at least one verb in the one or more words of the voice command; and
comparing the at least one verb to one or more verbs from a set of verbs, each verb in the set of verbs corresponding to at least one action from the plurality of voice-initiated actions.

10. The method of claim 1, wherein determining the voice-initiated action further comprises:
   determining, by the computing device, a context based at least part on data from the computing device; and
   determining, by the computing device, based at least partially on the context and the first audio data, the voice-initiated action.

11. The method of claim 1, further comprising: responsive to receiving an indication of a cancellation input, outputting, by the computing device, the at least one non-textual element for display in the first visual format.

12. The method of claim 1, wherein the first image representative of a speech recognition mode of the first application comprises a microphone.

13. The method of claim 1, wherein the second image is selected from a group consisting of: a compass arrow associated with a navigation feature of the second application, a play button associated with a media output feature of the second application, a pause button associated with the media output feature of the second application, a stop button associated with the media output feature of the second application, a telephone button associated with a telephone feature of the second application, and a search engine icon associated with a search feature of the second application.

14. The method of claim 1, wherein:
   the at least one non-textual element is displayed within a particular region of a display while being output for display in the first visual format; and
   the at least one non-textual element is displayed within the particular region of the display while being output for display in the second visual format.

15. The method of claim 1, wherein outputting the updated speech recognition GUI comprises: prior to outputting the at least one non-textual element in the second visual format, outputting, by the first application executing at the computing device, for display, an animation of the at least one non-textual element transitioning from the first visual format to the second visual format.

16. The method of claim 1, wherein the first audio data is associated with command speech from a user of the computing device and the second audio data is associated with non-command speech from the user.

17. A computing device, comprising:
   a display device;
   one or more processors; and
   a memory that stores instructions associated with a first application that when executed cause the one or more processors to:
      output, for display at the display device, a speech recognition graphical user interface (GUI) having at least one non-textual element in a first visual format;
      receive first audio data of a voice command that indicates one or more words of the voice command;
      determine, based on the one or more words of the voice command, a voice-initiated action indicated by the first audio data of the voice command, wherein the voice-initiated action is a particular voice-initiated action from a plurality of voice-initiated actions and the voice-initiated action is associated with a second application that is different than the first application;
      responsive to determining the voice-initiated action indicated by the first audio data of the voice command, and while receiving second audio data of the voice command that indicates one or more additional words of the voice command, and prior to executing the second application to perform the voice command, output, for display at the display device, an updated speech recognition GUI in which the at least one non-textual element, from the speech recognition GUI, transitions from being displayed in the first visual format to being displayed in a second visual format, different from the first visual format, indicating that the voice-initiated action is the particular voice-initiated action from the plurality of voice-initiated action that has been determined from the first audio data of the voice command, wherein:
         the first visual format of the at least one non-textual element is a first image representative of a speech recognition mode of the first application,
         the second visual format of the at least one non-textual element is a second image that replaces the first image and corresponds to the voice-initiated action from the plurality of voice-initiated actions, and
      the second image is different from other images corresponding to one or more other voice-initiated actions from the plurality of voice-initiated actions; and
      after outputting the updated speech recognition GUI and after receiving the second audio data of the voice command, execute, based on the first audio data and the second audio data, the second application that performs the voice-initiated action indicated by the voice command.

18. The computing device of claim 17, wherein the instructions associated with the first application, when executed, further cause the one or more processors to:
   determine, based on the first audio data and the second audio data, a transcription comprising the one or more words of the voice command and the one or more additional words of the voice command; and
   output, for display, the updated speech recognition GUI by at least outputting at least a portion of the transcription that excludes the one or more words.

19. A non-transitory computer-readable storage medium encoded with instructions associated with a first application that, when executed, cause one or more processors of a computing device to:
   output, for display at the display device, a speech recognition graphical user interface (GUI) having at least one non-textual element in a first visual format;
   receive first audio data of a voice command that indicates one or more words of the voice command;
   determine, based on the one or more words of the voice command, a voice-initiated action indicated by the first audio data of the voice command, wherein the voice-initiated action is a particular voice-initiated action from a plurality of voice-initiated actions and the voice-initiated action is associated with a second application that is different than the first application;
   responsive to determining the voice-initiated action indicated by the first audio data of the voice command, and while receiving second audio data of the voice command that indicates one or more additional words of the voice command, and prior to executing the second application to perform the voice command, output, for display at the display device, an updated speech recognition GUI in which the at least one non-textual element, from the speech recognition GUI, transitions from being displayed in the first visual format to being displayed in a second visual format, different from the first visual format, indicating that the voice-initiated action is the particular voice-initiated action from the plurality of voice-initiated action that has been determined from the first audio data of the voice command, wherein:
the first visual format of the at least one non-textual element is a first image representative of a speech recognition mode of the first application,
the second visual format of the at least one non-textual element is a second image that replaces the first image and corresponds to the voice-initiated action from the plurality of voice-initiated actions, and
the second image is different from other images corresponding to one or more other voice-initiated actions from the plurality of voice-initiated actions; and
after outputting the updated speech recognition GUI and after receiving the second audio data of the voice command, execute, based on the first audio data and the second audio data, a second application that performs the voice-initiated action indicated by the voice command.

20. The non-transitory computer-readable storage medium of claim 19, wherein the instructions, when executed, further cause the one or more processors of the computing device to:
determine, based on the first audio data and the second audio data, a transcription comprising the one or more words of the voice command and the one or more additional words of the voice command; and
output, for display, the updated speech recognition GUI by at least outputting at least a portion of the transcription that excludes the one or more words.

* * * * *